Patented July 6, 1954

2,683,145

UNITED STATES PATENT OFFICE 2,683,145

AZACYCLOHEPTANONES

Robert E. Lyle, Jr., and Gloria G. Lyle, Durham, N. H., assignors to Research Corporation, New York, N. Y., a corporation of New York No Drawing. Application April 17, 1953, Serial No. 349,548

8 Claims. (Cl. 260—239)

This invention relates to azacycloheptanones and to methods for making the same.

The compounds of the invention comprise azacycloheptanones of the general formula

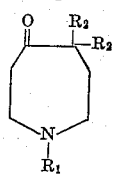

wherein $R_1$ represents a lower alkyl group and $R_2$ represents an aryl group, such as phenyl and substituted phenyl, and the acid addition salts, such as the hydrohalides, nitrates, acetates and the like, and quaternary salts such as the methiodides, methosulfates and the like. The compounds of the invention have a depressor action on arterial blood pressure.

The compounds of the invention may be made by the action of concentrated sulfuric acid, preferably at room temperature or below, on 1-alkyl-4-hydroxy-4-piperidyldiaryl carbinols.

The carbinols may be made by the reaction of aryllithium compounds on an ester of a 1-alkyl-4-hydroxynipecotate or by treating a 1-alkyl-4-piperidylidene-diarylmethane (Sperber et al., J. Am. Chem. Soc., 73, 5010 (1951)) with bromine water. In the latter method a mixture of the carbinol with the 1-alkyl-4-aryl-4-piperidyl aryl ketone is obtained.

Typical reactions utilized in the production of the compounds of the invention are illustrated below:

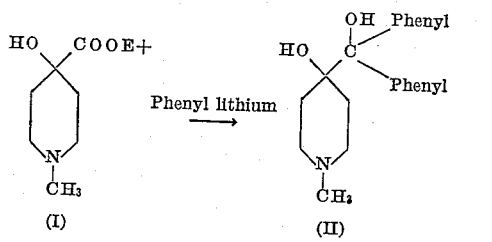

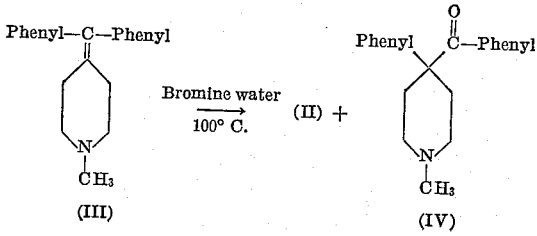

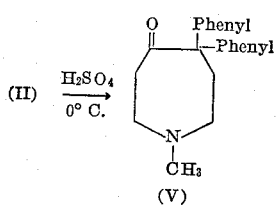

The following examples are illustrative of the methods and products of the invention:

*Preparation of 1-methyl-4-hydroxy-4-piperidyldiphenylcarbinol (II) from ethyl 1-methyl-4-hydroxyisonipecotate (I)*

The starting material may be prepared from 1-methyl-4-piperidone by the method described by Lavens, Kernishe Fabrik Ved A. Kongsted, Danish Patent 62,791, October 16, 1944 (Chem. Abs. 40, 4181 (1946)). In a three-necked flask equipped with dropping funnel, reflux condenser, and mercury sealed stirrer is placed 3.5 g. of lithium wire cut into short lengths and 50 ml. of dry ether. To this mixture is added dropwise 39 g. of bromobenzene in dry ether, and the reaction is stirred until all the lithium had disappeared. A solution of 12.4 g. of ethyl 1-methyl-4-hydroxy-isonipecotate (I) in 35 ml. of ether is then added very slowly maintaining a gentle reflux. After the addition is complete, the reaction is refluxed and stirred four additional hours and allowed to stand for 12 hours. The mixture is poured into water and ice and the resulting solid filtered off yielding 17.79 g. of 1-methyl-4-hydroxy-4-piperidyldiphenylcarbinol (II). After recrystallization from benzene, the solid melts at 160–160.5° C.

*Preparation of 1-methyl-4-hydroxy-4-piperidyldiphenylcarbinol (II) from 1-methyl-4-piperidylidenediphenylmethane (III)*

The starting material may be obtained from isonicotinic acid by a procedure similar to that described by N. Sperber et al., J. Am. Chem. Soc., 73, 5010 (1951). To 8.0 g. of 1-methyl-4-piperidylidenediphenylmethane (III) in a 500 ml. round-bottom flask is added 15 ml. of 48% hydrobromic acid and 100 ml. of water. The salt is not soluble. The mixture is heated to 100° C. in a steam bath and 230 ml. of a saturated solution of bromine in water is added in 15 ml. portions. At the end of this addition a slight orange color remains, but all solid is dissolved. Heating is continued for one-half hour and then the reaction mixture is allowed to stand at room temperature for 2 hours. The mixture is then reheated and transferred to a beaker and neutralized while hot with potassium hydroxide solution. On cooling, the oil which separates on neutralization crystallizes and is removed by filtration. A crude yield of 8.18 g. of a mixture of II and 1-methyl-4-phenyl-4-piperidyl phenyl ketone (IV) is obtained. This mixture is separated by trituration with low-boiling petroleum ether, the latter compound (IV) being soluble. The petroleum ether insoluble glycol (II) is obtained in a yield of 3.80 g., M. P. 160–160.5° C. after recrystallization from benzene.

*Preparation of 1-methyl-5,5-diphenyl-1-aza-4-cycloheptanone (V) from 1-methyl-4-hydroxy-4-piperidyldiphenylcarbinol (II)*

In a 250 ml. Erlenmeyer flask 27 ml. of concentrated sulfuric acid is cooled to 0° C. by an ice-salt bath. To this is added 8.0 g. (0.027 mole) of 1 - methyl - 4 - hydroxy-4-piperidyldiphenylcarbinol (II) in portions. The mixture is allowed to stand at 0° C. for 3 hours and is then poured onto ice and neutralized with sodium hydroxide. An oil separates and is taken up in ether. After separation of the layers, the aqueous layer is extracted with two additional portions of ether. The combined ether extracts are dried over anhydrous potassium carbonate. Removal of the ether by distillation leaves an oil which crystallizes on treatment with low boiling petroleum ether to give 6.00 g. (80%) yield of 1-methyl-5,5-diphenyl-1-aza-4-cycloheptanone (V). Recrystallization of V from methanol and water mixture gives the pure solid, M. P. 91–92° C.

The hydrochloride salt of V is prepared by adding a saturated solution of hydrogen chloride in ether to an ether solution of V. On recrystallization from acetone or ethanol-ether the salt is obtained pure, M. P. 244–246° C.

Treatment of an ethanol solution of V with 3 equivalents of methyl iodide gives, on warming and precipitation with dry ether, V methiodide, purified by recrystallization from ethanol, M. P. 201–203° C.

By the method described above 1-methyl-5,5-bis-o-tolyl-1-aza-4-cycloheptanone may be prepared from the corresponding glycol in 55% yield. The melting point of the free base (impure) is 103–111° C., and of the hydrochloride salt, 231–233° C.

We claim:

1. Compounds of the group comprising azacycloheptanones of the general formula

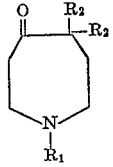

wherein $R_1$ is a lower alkyl group and $R_2$ are monocyclic aryl groups, and the acid addition salts and quaternary salts thereof.

2. 1-methyl-5,5-diphenyl-1-aza - 4 - cycloheptanone.

3. Acid addition salts of 1-methyl-5,5-diphenyl-1-aza-4-cycloheptanone.

4. 1-methyl-5,5-diphenyl - 1 - aza - 4 - cycloheptanone hydrochloride.

5. Quaternary salts of 1-methyl-5,5-diphenyl-1-aza-4-cycloheptanone.

6. 1-methyl-5,5-diphenyl - 1 - aza - 4 - cycloheptanone methiodide.

7. A method of making N-alkyl-5,5-diaryl-1-aza-4-cycloheptanones which comprises treating a 1-alkyl-4-hydroxy-4-piperidyl-diarylcarbinol with concentrated sulfuric acid and recovering the azacycloheptanone thereby produced.

8. The method which comprises treating 1-methyl - 4 - hydroxy - 4 - piperidyldiphenylcarbinol with sulfuric acid and recovering the 1 - methyl-5,5-diphenyl-1-aza-4-cycloheptanone thereby produced.

No references cited.